UNITED STATES PATENT OFFICE.

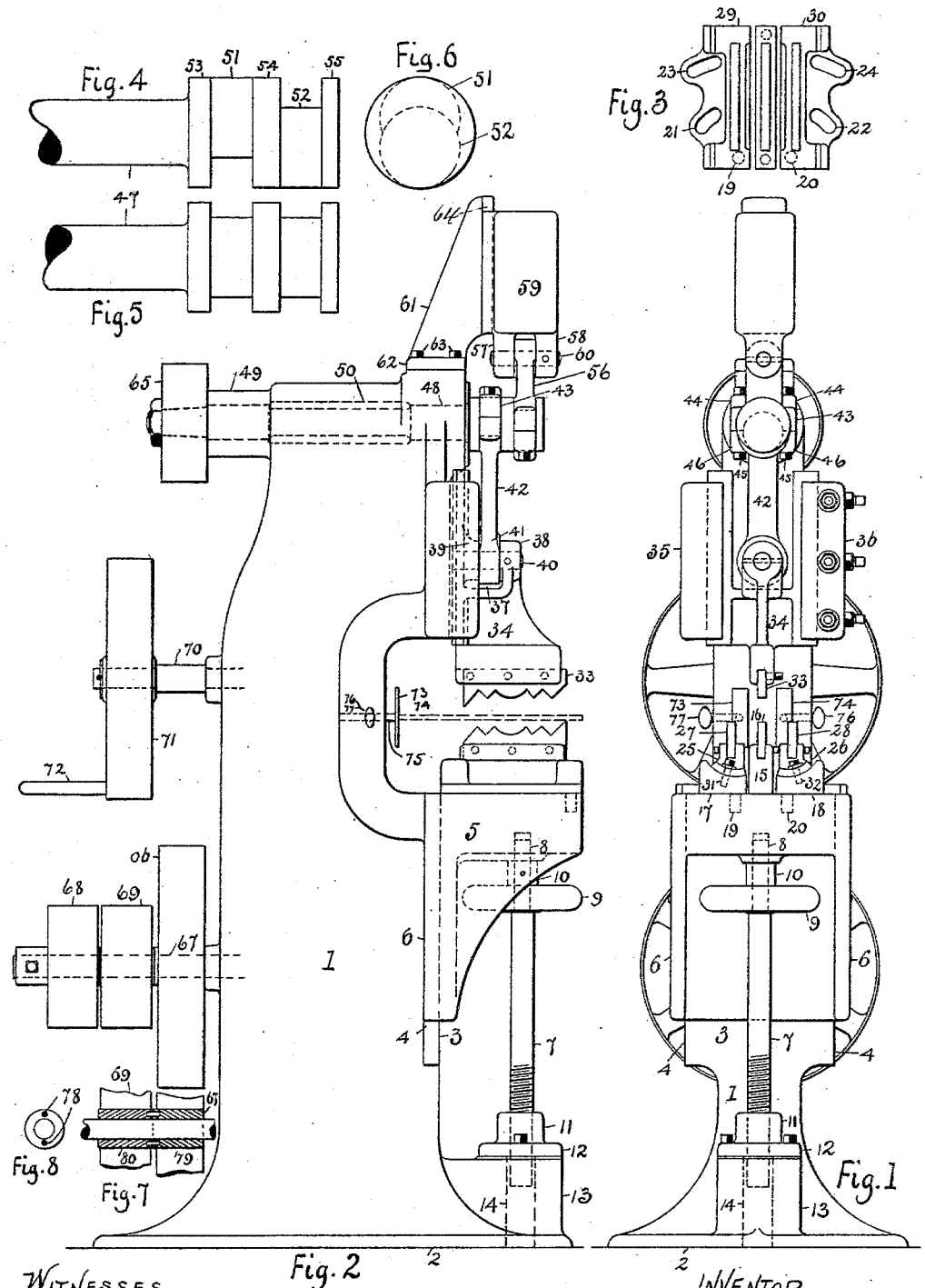

GEORGE HENDERSON, OF PHILADELPHIA, PENNSYLVANIA.

CURVE-MOLDING MACHINE.

SPECIFICATION forming part of Letters Patent No. 569,714, dated October 20, 1896.

Application filed February 14, 1896. Serial No. 579,261. (No model.)

*To all whom it may concern:*

Be it known that I, GEORGE HENDERSON, a citizen of the United States, residing at Philadelphia, in the county of Philadelphia and State of Pennsylvania, have invented certain new and useful Improvements in Curve-Molding Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in machines for forming sheet-metal moldings by mechanism driven by machine-power or hand-power, the machine being adapted for either; and the objects of my improvement are to greatly simplify my machine over those heretofore constructed for such purposes; to balance the reciprocating parts for rapid, smooth, and noiseless running, it being essential to work the dies rapidly to produce good work cheaply; to easily and readily adjust the table and the fixed die thereon for the weight of the blow most desirable and efficient; to so arrange and construct the dies that curves can be formed in either direction of a circle, even the smallest, or in a segmental direction, and to construct the dies that they may be cheaply and readily produced by the users of the machines without the necessity of employing skill other than their own for such production, the dies when not requiring sharp corners being of sufficient utility if made of hard wood. The features I have enumerated are important to the makers of cornices and ornamental sheet-metal work. I attain these objects by the mechanism illustrated in the accompanying drawings, in which—

Figure 1 is a front elevation of my machine. Fig. 2 is a side elevation. Fig. 3 is a plan view of the lower die and holder and the guides, seats, and holders. Figs. 4, 5, and 6 are views of the main shaft; Fig. 7, a vertical section through the attached pulleys of the stud-shaft; Fig. 8, an end view of the hub of a stud-shaft pulley.

Similar figures of reference refer to similar parts throughout the several views.

The frame 1 of my machine is a column, upright in general direction and of rectangular hollow section, with a wide base 2, whereon to rest upon the floor, the upright part of the column 1 being shaped to receive the parts necessary to be thereto attached. At the front of the column 1 is a flat face 3, having bevel-edged guides 4 extending perpendicularly along each side. A table 5 is movably seated against the face 3, and its outer edges 6 are hooked over the guides 4 to maintain its position against the face 3, along which it slides. The table 5 is supported and adjusted in its vertical positions by a screw 7, the upper end of which enters a pocket 8 in the under side of the table 5. A hand-wheel 9, having a hub 10 upon its upper side, is secured to the screw 7, the hub 10 touching the table 5, which rests upon it. The lower end of the screw 7 is screwed into a nut 11, having a flange 12 upon its lower surface, which is seated upon and secured to a hollow boss 13, formed upon the front of the column 1, the screw 7, when screwed through the nut 11, passing into the central space 14 of the boss 13. Thus the table is securely held in any desired elevation, and its adjustment to any other elevation is quickly and readily effected, while the means employed are firm, secure, simple, not liable to derangement or abnormal wear, and the adjustment, which regulates the blow struck, is such as to be of the greatest delicacy, and the machine does not require to be stopped or in the slightest retarded for that purpose. This is highly important for this class of work and saves much valuable time while greatly perfecting the work.

Secured to the table 5 at its top is a central die-holder 15, permanently attached and carrying a die 16. On either side of the die-holder 15 are secured side guide-holder seats 17 18. These seats are pivoted to the table 5 at 19 20, to permit radial movement of the seats 17 18, which are secured when so moved by bolts passing through slots 21 22 23 24 into the table 5, the slots being curved radially from the pivots 19 20. Side-guide holders 25 26 are secured to the seats 17 18 and side guides 27 28 are secured thereto. It will be evident that the side guides 27 28, their holders 25 26, and seats 17 18 can be moved outwardly at their ends 29 30, removed from the pivots 19 20, the movement being radial, outward, to enable the side guides, which act as guides for the work being done, to give correct and accurate direction for exact segmental work. The side-guide seats 17 18 and holders 25 26 have also another very important construction and function, which will be seen by observing the upper part of the seats 17 18, they being hollowed or concave, while the holders 25 26, which seat therein, are rounded or convex to the same extent to form good bearing-seats, screws 31 32 securing the holders 25 26 to the seats 17 18.

By means of the construction just explained the side guides 27 28 can be turned radially toward the central die 16, thus permitting the formation of circular work. The upper die 33 is secured in a cross-head 34, having vertical movement in guideways 35 36, formed upon the frame 1. Above the die 33 and about midway of the cross-head 34 there is formed upon it a jaw 37, having an outer boss 38 and an inner boss 39, through which is inserted and secured a bearing-pin 40. Journaled upon the pin 40 is one end 41 of connecting-rod 42. The upper end of this rod 42 has a cap 43, having lugs 44, through which are screws 45, secured in corresponding lugs 46, formed on the rod 42, the end of the rod 42 and cap 43 being bored out to fit over a crank of the shaft 47, presently to be described.

The main shaft 47 is seated at one end in a bearing 48, formed in the front of the upper part of the column 1, and at the other end in a boss 49, formed at the back of the column 1, and between 48 and 49 the shaft 47 is drawn down and the chamber 50 is enlarged to prevent contact. The shaft 47 has formed at its outer end cranks 51 52, a collar 53 being inside of 51, a collar 54 being between 51 and 52, and a collar 55 being outside of 52. The cranks 51 52 are preferably opposite each other, or one hundred and eighty degrees apart. Upon crank 51 the rod 42 of the cross-head 34 is connected, and upon 52 another rod 56 is connected, its construction being precisely similar at each end to the rod 42, already described. The rod 56 extends upward from the crank 52 and is inserted between lugs 57 58 of a balance-weight 59, to which it is secured by a bearing-pin 60.

The weight 59 is guided by a bracket 61, having flanges 62, through which bolts 63 secure it upon the top of the column 1. The bracket 61 has guides 64 upon each side, around which the weight 59 engages and upon which it slides up and down. The weight 59 balances the reciprocating parts attached to the opposite crank, prevents jarring, and permits smooth and rapid running.

The shaft 47 has a pulley 65 upon its outer end, which is driven from the pulley 66 on the driving stud-shaft 67, attached to the column 1 toward its lower part, and upon this stud-shaft 67 are a loose pulley 68 and a pulley 69, which are belted to the main line of shafting when the machine is power-driven, the power being conveyed by a belt from pulley 66 to 65. The stud-shaft is securely fixed to the frame 1, projects therefrom, but does not revolve. The transmission-pulleys 66 69 revolve freely on this stud-shaft, being secured to each other by dowel-pins 78, inserted into the hub 79 of pulley 66 and hub 80 of pulley 69. This causes them to revolve in unison, and when the power-belt is upon 69 it is transmitted to 66, and thence to 65 and to the machine.

When it is desired to drive the machine by hand or manual power, I attach a stud 70 to the back of the column 1 and place thereon a pulley 71, having thereto attached a crank-handle 72, by which a man may turn the pulley 71, it being free to revolve upon the stud 70. The power-belt is then removed from pulley 69 and replaced by a belt connecting the pulleys 71 69, which convey the force developed by manual power. Guides 73 74 are attached to the frame 1. They have shanks 75 inserted into holes bored into the front of the frame 1 and are capable of being adjusted toward or from the dies 16 33 and serve as a gage for the back edge of the sheet being operated upon and are secured in the desired position by clamping-screws 76 77.

With the description of my machine and with the drawings for reference its operation will readily be understood by those skilled in the art to which it applies.

Power being applied either to pulleys 71 or 69, as dictated by circumstances as to its supply, the power so applied revolves the shaft 47 and cranks 51 52. The crank 51, through its connecting-rod 42, conveys reciprocating motion to the cross-head 34 and die 33, striking blows upon the sheet of metal (shown in dotted lines in Fig. 2) placed upon the die 16, and side guides 27 28, the amount of force being determined by the elevation of the table 5, seats 17 18, die-holders 25 26, and side guides 27 28, upon which the metal plate (shown in dotted lines) rests, and by which, through the means provided by the screw 7 and hand-wheel 9, gages the proximity of the sheet operated upon to the die 33 and thereby the force of the blow. The crank 52, by means of the rod 56, moves the weight 59 oppositely to the parts heretofore mentioned, and thereby prevents jarring, jerky, or irregular motions and enables the production of smooth work rapidly, which can only be done by light rapid blows, which make no dents or ridges.

The machine can be run on upper floors of ordinary lightly-constructed buildings, as at eight hundred revolutions per minute the movement is nearly imperceptible.

The balancing of the parts greatly promotes the output of merchantable product of a high class and prolongs the durability and life of the machine.

Having described the best form I am at present aware of for constructing my machine, but not thereby confining myself or my invention to the exact construction I have set forth as to details in the machines I have already constructed, I claim—

1. In a curve-molding machine, a vertical framework therefor rectangular in section, a shaft thereto attached at its lower part for power transmission, pulleys thereon, a main shaft seated in the upper part of the framework and projecting outward therefrom at either end, a driven pulley at one end, double cranks at the other end, means to connect a cross-head and die to one crank for reciprocating motion, and means to connect the other crank to a reciprocating balance-weight, substantially as described.

2. In a metal-molding machine, a framework therefor, a driving and a main shaft therefor, pulleys thereon, means to communicate reciprocating motion from the main shaft to a guided cross-head having a die thereto attached, means to balance the reciprocating parts by a guided reciprocating balance-weight worked from the main shaft, and a movable table, guided upon the framing, dies thereto attached, and means to adjust the table and dies perpendicularly, substantially as described.

3. In a machine for forming metal moldings, a framework therefor, driving means thereto attached, means to convert the revolving driving motion into reciprocating motion to work dies, means to balance the reciprocating parts, an adjustable table, means to adjust the table, a central die thereon, and side guides thereon having means for parallel adjustment toward or from the central die, substantially as described.

4. In a curve-molding machine, a frame therefor, power-driving mechanism thereto attached for revolving motion, means to convert the revolving driving motion into reciprocating motion for working dies, means to balance the reciprocating parts, a table having means for vertical adjustment, a central seat thereto attached having a die-holder and a die thereto secured, a seat each side thereof pivotally attached at one end to the table to permit the seat to swing radially from the central seat, and guide-holders seated thereon having means for radial adjustment from a vertical line and having guides secured therein, substantially as described.

5. In a curve-molding machine, a frame therefor, a shaft thereto attached and having pulleys thereon for receiving power from the source of power supply, a pulley upon the shaft and carrying a belt to deliver the power to a pulley upon the main shaft also attached to the framing, means upon the framing intermediate to the aforesaid shafts for the attachment of hand or manual power and means to connect the hand or manual mechanism with the lower shaft and therefrom to the upper shaft for delivering the manual power to the reciprocating mechanism, substantially as described.

6. In a metal-molding machine, a framework therefor, means thereon and thereto attached for communicating power from the source of power supply, means to convey the power therefrom to a main shaft having means thereon and thereto attached to communicate oppositely-reciprocating motions, a balance in connection with one of the means for reciprocating motion, and dies attached to the other means for reciprocating motion, an adjustable table carrying dies oppositely to the aforesaid dies, and guides attached to the framing and means for their adjustment and security, substantially as specified.

7. In a curve-molding machine, a double-crank shaft therefor formed of an integral piece, the double cranks being eccentric to the center thereof, oppositely, having at each outside and being separated by, a collar concentric with the shaft, substantially as described.

8. In a machine, a stud-shaft fixed to the machine-frame and projecting therefrom, a free pulley thereon, a pair of free pulleys thereon and means to secure the pair of free pulleys to each other for simultaneously revolving upon the fixed shaft, substantially as described.

9. In a curve-molding machine, means for reciprocally working a die, an adjustable table having a central die-holder thereto attached, a die secured thereto, and adjacent to each side thereof but unattached thereto, side-guide-holder seats, each one being pivoted to the adjustable table at one end, means to secure the holder-seats in parallel or diverging positions, concave seats within the upper face of the holder-seats, side-guide holders seated therein carrying side guides, and means to adjust and secure the side-guide holders toward or from the central die independent of each other, and independent of the central die-holder, substantially as described.

In testimony whereof I affix my signature in presence of two witnesses.

GEORGE HENDERSON.

Witnesses:
SAML. B. S. BARTH,
R. C. WRIGHT.